United States Patent [19]

Seick

[11] 3,977,730

[45] Aug. 31, 1976

[54] JUNCTION ELEMENTS FOR PNEUMATIC CONVEYOR PIPES

[75] Inventor: Günter Seick, Wanne-Eickel, Germany

[73] Assignee: Steag Aktiengesellschaft, Essen, Germany

[22] Filed: Sept. 16, 1974

[21] Appl. No.: 506,016

[30] Foreign Application Priority Data
Sept. 18, 1973 Germany............... 7333839[U]

[52] U.S. Cl. ............................. 302/64; 138/92; 285/16; 285/179
[51] Int. Cl.² ........................................ B65G 53/52
[58] Field of Search .............. 302/64; 285/16, 179; 138/92, 103, 172, 178

[56] References Cited
UNITED STATES PATENTS

| | | | |
|---|---|---|---|
| 785,176 | 3/1905 | Mommertz | 302/64 |
| 786,991 | 4/1905 | Podlesak | 302/64 |
| 898,882 | 9/1908 | Hawkins | 285/16 |
| 1,019,548 | 3/1912 | Spitzer | 285/16 |
| 1,044,181 | 11/1912 | Hudson | 302/64 |
| 1,153,684 | 9/1915 | Griffin | 302/64 |
| 1,960,412 | 5/1934 | Domina | 285/16 |
| 1,981,099 | 11/1934 | Fender | 302/64 |
| 3,833,267 | 9/1974 | McCumber | 302/64 |

*Primary Examiner*—Evon C. Blunk
*Assistant Examiner*—Jeffrey V. Nase
*Attorney, Agent, or Firm*—Malcolm W. Fraser

[57] ABSTRACT

Junction elements for pneumatic conveyor systems for use in, for example, power stations include a pair of intersecting arms and an impact plate at the outside of the junction between the arms. The impact plate is reinforced by a reinforcing plate which is held by screw clamps in a frame fixed to the impact plate.

1 Claim, 3 Drawing Figures

JUNCTION ELEMENTS FOR PNEUMATIC CONVEYOR PIPES

This invention relates to junction elements for pipes along which solid material in finely divided form is passed in an air or other gas current, the elements including arms and an impact plate situated at the outside of the junction between the arms.

Such junction elements are needed, for example, in power stations which have coal-dust-fired boilers. Because the junction elements are subject to considerable wear by the finely divided solid material, which is turned at the junction, impact plates, as mentioned above, are placed at the junctions and it is desirable that the impact plates should be usable for a reasonable time. These impact plates normally consist of steel plates about 15 mm. thick, which are placed on the outside of a junction element and are welded on to it. However, even these impact plates do not withstand the wear and stress for very long and they are used up after 10 to 14 days. Since changing the impact plates would lead to rapid destruction of the junction elements, reinforcing plates about 30 mm. of iron or steel are placed outside of the impact plates, and are welded to the impact plates. The iron or steel plates must be made of weldable material but this, however, normally possesses a low resistance to wear. For this reason the reinforcing plates must be detached from the impact plates after 10 to 14 days and replaced by new ones.

Replacement of the reinforcing plates is expensive because, of course, a plurality of junction elements are put into the dust pipes of boilers fired by coal dust. In addition, because the replacement of the reinforcing plates cannot take place during operation, because it leads to troubles with the sensitive burners in the boiler, at least one part of the power station, at the very least one boiler, must be brought to a standstill during the repair and maintenance work. The work itself takes a considerable length of time, because the used reinforcing plates must first of all be separated from the impact plates and then new reinforcing plates must be welded on. In addition welding tools are necessary which must be transported from one junction to the next.

It is an object of the invention to avoid these disadvantages and provide a junction element in which worn parts can be exchanged relatively easily. According to the invention, a frame open on one side is fixed to the impact plate to enable a reinforcing plate to be held by clamping means. With this form of junction element no machines or apparatus are required for changing the reinforcing plate, it is sufficient to loosen the clamping means, to remove the worn reinforcing plate from the frame and to insert the new one into the frame. After tightening the clamping means, the junction element is once more ready for service. A further advantage of the new form of junction element is that it allows the use of extremely wear-resistant reinforcing plates, for example those which are of case-hardened nickel steels and which have a substantially longer life than reinforcing plates made of weldable steel.

In the preferred embodiment the frame consists of U-shaped members which are welded on to the front of the impact plate. The U-shaped members form a pocket into which the reinforcing plate can easily be introduced. If, moreover, the clamping means comprises screws, which are held in sockets in the open sides of the U-shaped members, then the worn out reinforcing plates are loosened with little handling and the new reinforcing plate is easily fixed in the frame, because the reinforcing plate is pressed down against the impact plate upon tightening of the screws. Thus, the reinforcing plate is secured at the same time as the impact plate thickened. Nevertheless, it is to be recommended that an asbestos sheet be placed between the reinforcing plate and the impact plate to provide packing which compensates for any unevenness of the surfaces of the reinforcing plate and the impact plate which bear against one another.

The invention will now be described by way of example with reference to an embodiment thereof shown in the accompanying drawings, in which.

Figure 1:
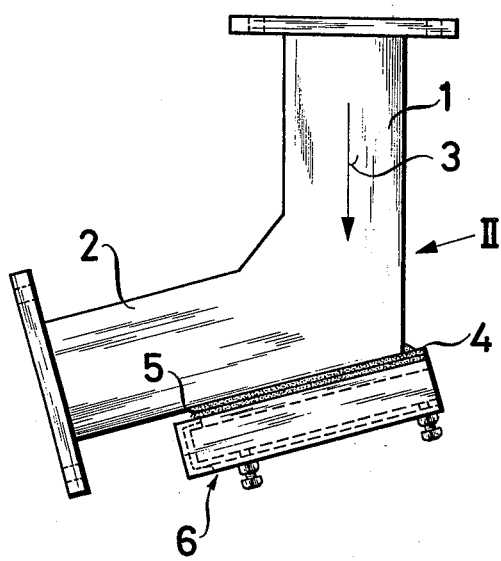
FIG. 1 is a side view of a junction element.
Figure 2:
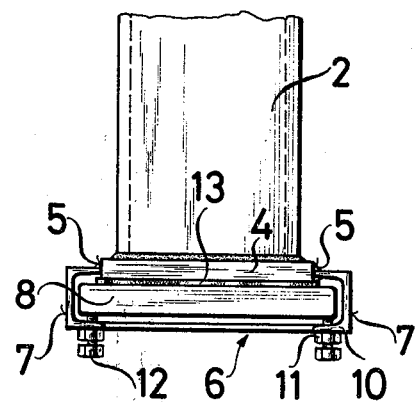
FIG. 2 is a view in the direction of the arrow II in FIG. 1.
Figure 3:
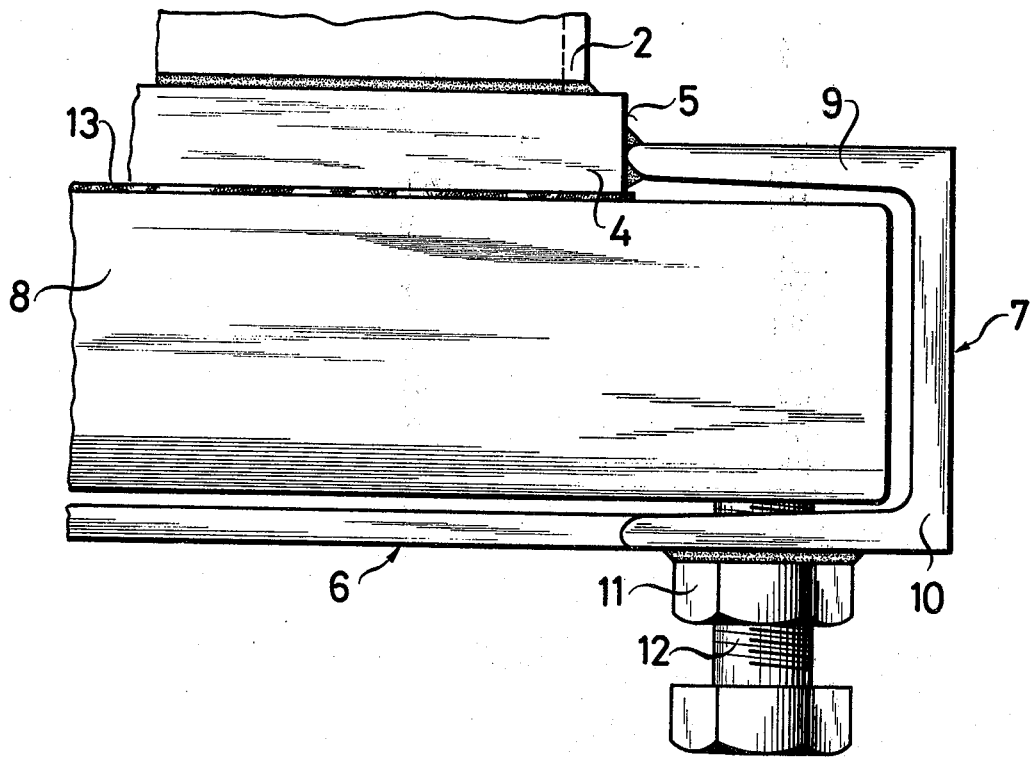
FIG. 3 is an enlarged view of part of FIG. 2.

The junction element shown in the drawings is intended for pipes in which solid material such as coal dust is moved along in a stream of air. The element consists of two arms 1 and 2 which each have a rectangular cross-section. The direction of feed through the junction element is shown by the arrow 3.

On the outside of the junction arm 2 an impact plate 4 is situated at the position at which the solid material being moved by the air current is turned. The impact plate 4 is welded to the junction arm 2. The impact plate 4 is of such size that all the solid material moved through junction arm 1 by the air current strikes the impact plate and is turned by it. Since the impact plate 4 is exposed to considerable wear by the solid material passing through the pipework and is worn out after about 10 to 14 days, a frame 6 made of U-shaped iron members 7 is secured by welding to the ends 5 of the impact plate 4.

The frame 6 is open on one side, so that a reinforcing plate 8 can be pushed into the frame between the sides 9 and 10 of the U-shaped iron members. Socket nuts 11 are welded on to the open sides of the U-shaped iron members 7 and screws 12 are fitted into these nuts 11 to fasten the reinforcing plate 8 in the frame 6 and to press it against the impact plate 4.

To compensate for any unevenness of the respective surfaces of the impact plate and the reinforcing plate 8, an asbestos sheet 13 is placed between the impact plate 4 and the reinforcing plate 8 which at the same time increases the resistance of the impact plate to wear.

To exchange a worn reinforcing plate 8 all that is necessary is that the screws 12 should be loosened, then the reinforcing plate 8 can be taken out of the frame 6 and replaced by a new reinforcing plate. After the screws 12 have been tightened, the junction element is again ready for service.

What I claim is:

1. In an elbow having two arms at a divergent angle to each other and provided with inlet and discharge openings for pipes along which solid material in finely divided form is passed in a current of air or other gas, the combination of
    a flat impact plate fixed to the outer side of said elbow adjacent the apex of the angle between the arms thereof,
    a frame having a pair of U-shaped members facing each other to provide an open ended channel,
    welded connections between the edges of said frame members and the ends of said impact plate respectively,
    a flat reinforcing plate in slidable engagement with said channel to bear flatwise against said impact plate, and
    screw members on said frame for releasably urging said reinforcing plate against said impact plate.

* * * * *